(No Model.) 4 Sheets—Sheet 1.
E. LESLIE.
MILK STERILIZING APPARATUS.
No. 529,075. Patented Nov. 13, 1894.
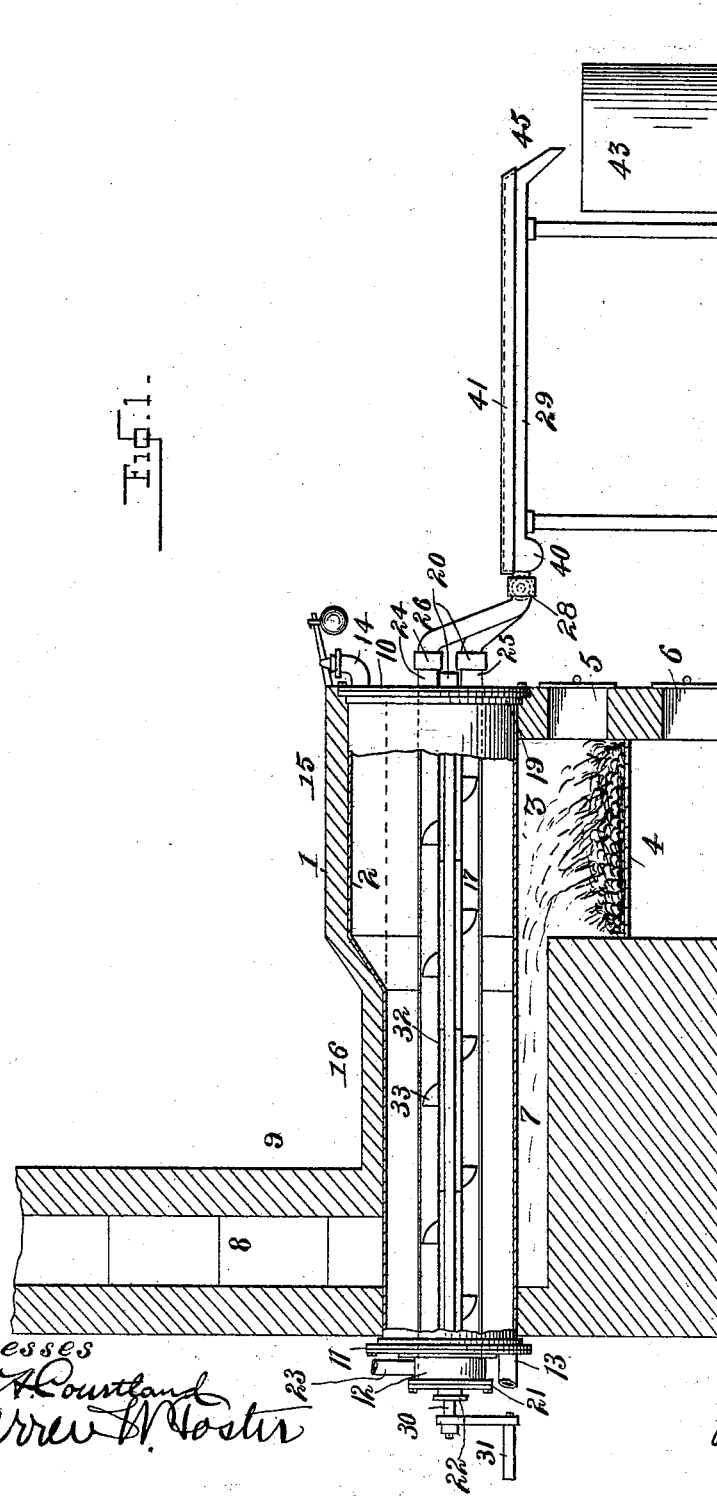
Witnesses
Wm H Courtland
Warren W Foster
Inventor
Edward Leslie
by H R Smith
his Atty

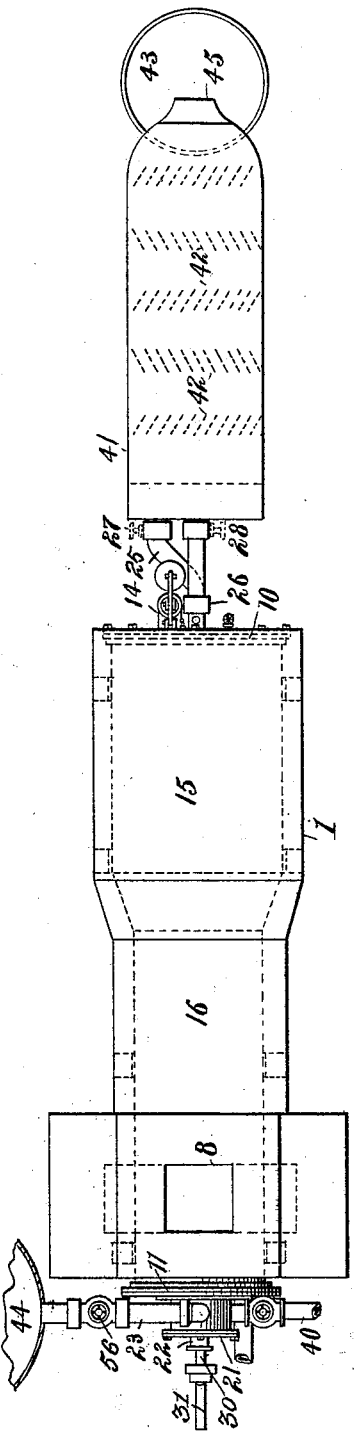

(No Model.) 4 Sheets—Sheet 3.

E. LESLIE.
MILK STERILIZING APPARATUS.

No. 529,075. Patented Nov. 13, 1894.

Witnesses
Wm H Courtland
Warren W Foster

Inventor
Edward Leslie
G P P Smith
his Atty (No Model.) 4 Sheets—Sheet 4.

E. LESLIE.
MILK STERILIZING APPARATUS.

No. 529,075. Patented Nov. 13, 1894.

Witnesses
Wm. H. Courtland
Warren Wooster

Inventor
Edward Leslie
by A. P. Smith
his Atty.

UNITED STATES PATENT OFFICE.

EDWARD LESLIE, OF PATERSON, NEW JERSEY.

MILK-STERILIZING APPARATUS.

SPECIFICATION forming part of Letters Patent No. 529,075, dated November 13, 1894.

Application filed July 13, 1893. Serial No. 480,440. (No model.)

*To all whom it may concern:*

Be it known that I, EDWARD LESLIE, a subject of the Queen of Great Britain, residing at Paterson, in the county of Passaic and State of New Jersey, have invented certain new and useful Improvements in Milk-Sterilizing Apparatus; and I do hereby declare the following to be a full, clear, and exact description of the invention, such as will enable others skilled in the art to which it appertains to make and use the same.

My invention relates to that class of apparatus employed in sterilizing milk, that is to say subjecting milk to the action of heat to a certain temperature approximating the boiling point of water which is sufficient to kill all the germs of disease which may exist in the milk.

The object of my invention is to design an apparatus which shall have large capacity with small fuel consumption, shall be easily cleaned and conveniently operated by a small force of men. To secure these objects I have designed an apparatus in which the milk passes under control through a milk conduit which is surrounded by a body of hot water, the water being hottest at the delivery end of the conduit and coolest at the supply end. The milk conduit is supplied with an agitating apparatus which is so constructed that a comparatively thin body of milk is presented to the heating surface and is continually agitated. The milk after being sterilized is discharged upon a cooling table where its temperature is reduced to a point at which it can be safely bottled.

All the parts of the sterilizing apparatus are removable and easily cleaned.

The preferred form of my apparatus is illustrated in the accompanying drawings, in which—

Figure 4:
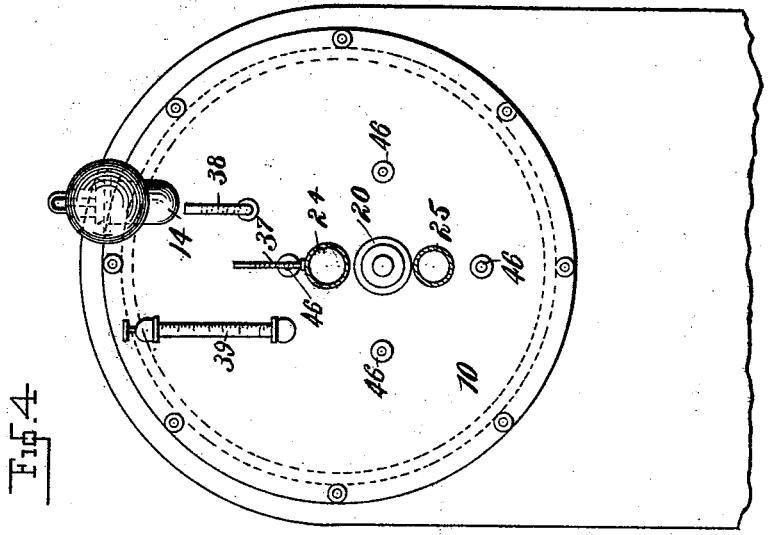
Figure 3:
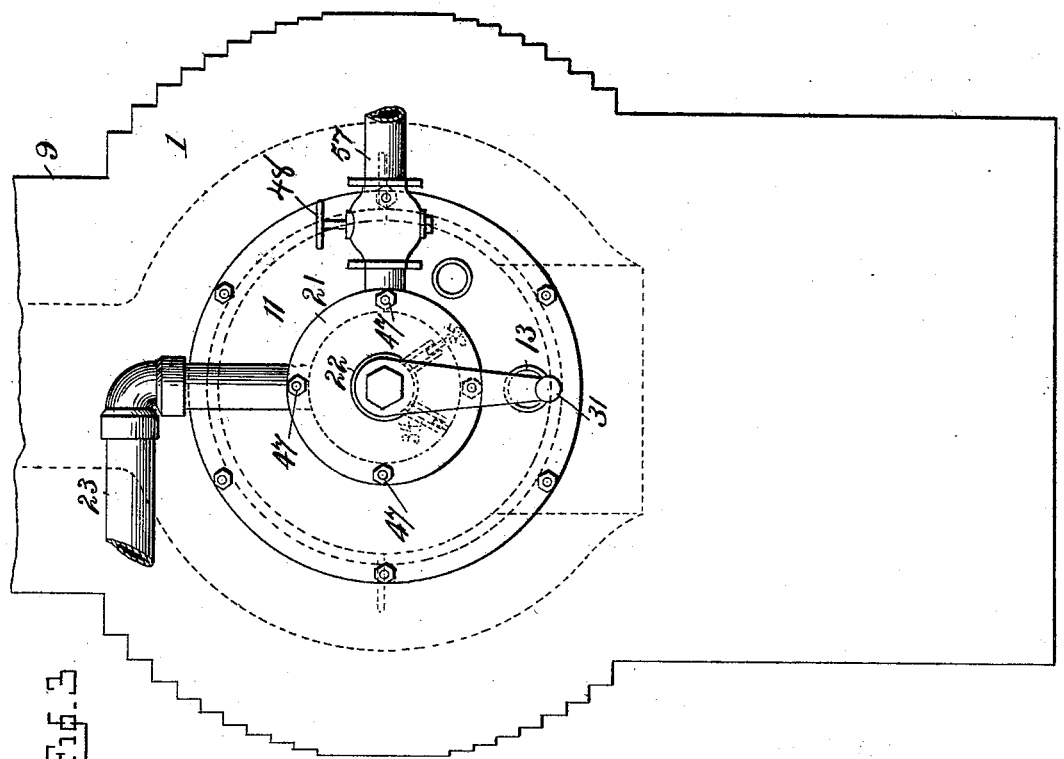
Figure 5:
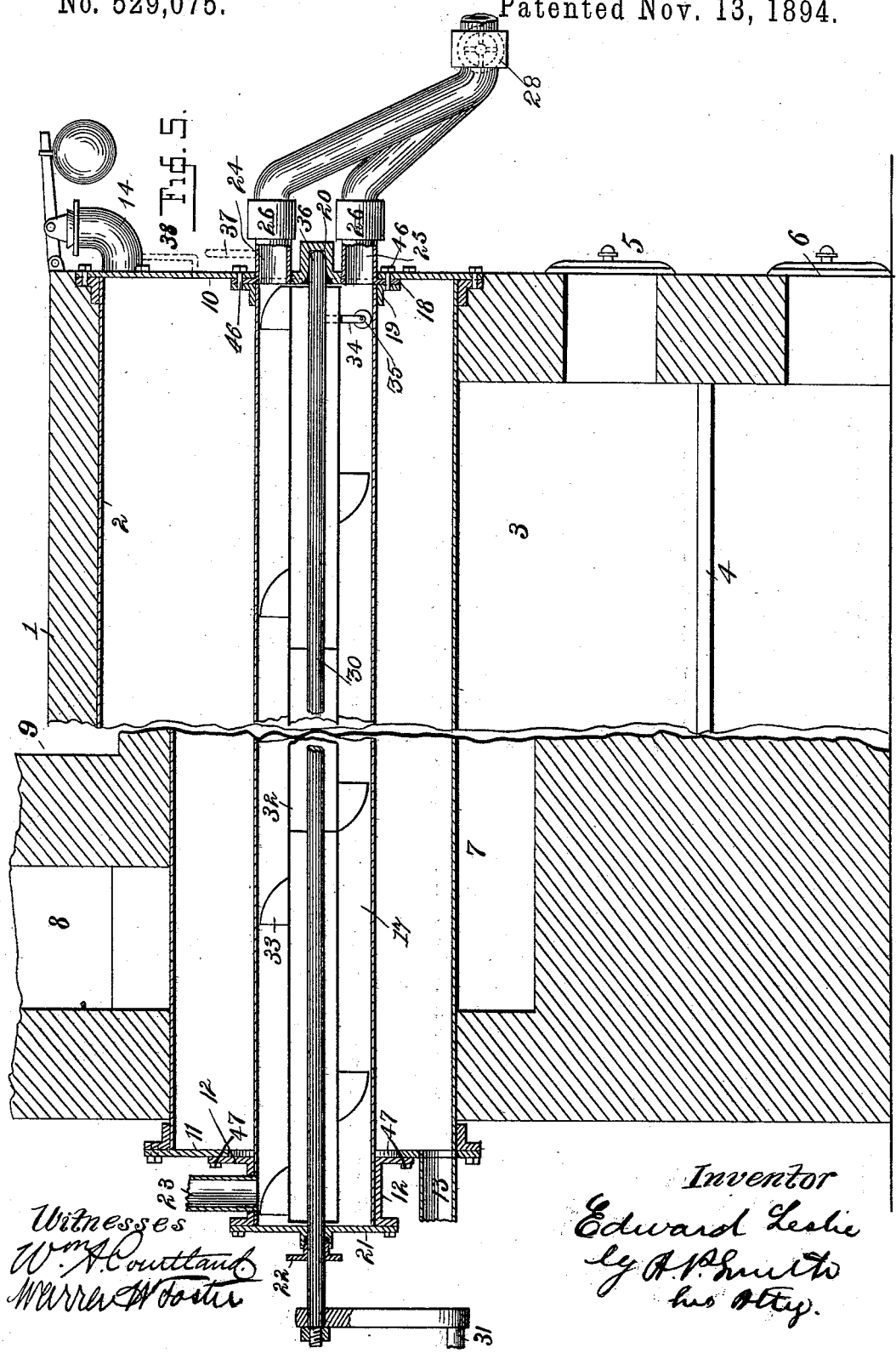

Figure 1, is a vertical longitudinal section of the apparatus. Fig. 2, is a plan view of the same. Figs. 3, and 4, are end views of the sterilizing apparatus, the cooling table being removed. Fig. 5, is a vertical section of boiler on larger scale.

Throughout the specification like reference figures refer to like parts.

1, is the setting of the boiler of any suitable masonry.

2, is the hot water boiler and 3, is the furnace by which it is heated.

4, is the grate; 5, the furnace door and 6, the ashpit door of said furnace.

7, is an extension flue passing along the under side of the boiler 2, and 8, is the vertical flue passing up the chimney 9.

10, is the head of the boiler at that end which has the wagon top portion 15. 11, is the head of the other end 16, of the boiler which has a circular cross-section.

12, is a cast iron collar bolted to the head 11, into which the end of the milk conduit 17, passes.

13, is the connection by which water is fed into or removed from the hot water boiler 2.

14, is a safety valve of the well-known shape attached to the boiler 2.

18, is the head for the milk conduit 17, which is fastened to the flange 19, on the end of said conduit and also to the boiler head 10. This head 18, has a central projection 20, which is hollowed out to form a recess with a flaring mouth opening into the milk conduit 17. 21, is the other head of the milk conduit 17, riveted or bolted to the collar 12, and 22, is the stuffing box through which the shaft 30 passes.

23, is the supply pipe through which milk is fed to the milk conduit 17, from the reservoir 44.

24, is a discharge pipe connected to the upper portion of the other end of the milk conduit 17, and 25, is a second discharge pipe connected to this end of the conduit at its lowest point. These pipes are connected to their extension portions by the union couplings 26.

27, is a valve controlling pipe 25, and 28, is a valve controlling pipe 24.

29, is the cooling table upon which the milk is discharged after being sterilized.

The rotatable shaft 30 passes through the milk conduit 17, and is operated by the crank 31, or by any other convenient means. This crank carries a metal cylinder made preferably in sections, 32, which cylinder is of considerable diameter being half or a third of the diameter of the milk conduit 17. Any number of stirring blades, 33, may be mounted on the exterior of cylinder 32.

34, are projecting arms on the farther end of cylinder 32, provided with rollers 35.

The farther end of the shaft 30, is rounded off at 36, so that it will easily enter the recess 20, which has a flaring mouth, as above described.

37, is a thermometer mounted on the milk discharge tube 24, and 38, is a thermometer mounted on the hot water boiler 2, so that the temperature of the milk and the hot water can be determined at any moment.

39, is the usual form of water gage on the boiler 2.

At the upper end of the slightly inclined cooling table 29, is formed the reservoir 40, in which the milk is distributed from the discharge pipes and from which it may flow in an even sheet over the surface of the table.

41, is a cover fitting tightly over the raised sides of the cooling table 29.

42, are rows of diagonal frets which are oppositely inclined so as to thoroughly mix and distribute the milk over the surface of the table.

43, is the reservoir into which the cool milk is discharged by the spout 45.

The operation of my invention is as follows: The hot water boiler being filled with water up to the water line shown in dotted lines, Fig. 1, a fire is built in the furnace 3. When the temperature of the water as shown by thermometer 38, has risen to the proper point, milk is admitted from reservoir 44, through pipe 23, to conduit 17. The outlet pipe 25, is closed by means of the valve 27, and the milk accordingly fills the conduit 17, before it begins to overflow through pipe 24, down on to the cooling table 29. The manipulation of valve 56, in the inlet pipe 23, will evidently regulate the speed of the flow of milk through the conduit and its temperature can thereby be controlled. Rotation is given to shaft 30, by crank 31, and the stratum of milk, which is between the walls of the conduit 17, and the cylinder 32, is kept continuously stirred by the stirring blades 33. It is evident that the water over the furnace 3, will be hotter than that in the other end of the boiler so that the cool milk will be received by the cooler water and its temperature raised gradually as it advances along the conduit 17. The making of that portion 15, of the boiler over the furnace in the wagon top shape affords additional room for the circulation of the hotter portion of the water at that end without its being forced out to the other end 16, of the boiler.

To empty the sterilizer of milk the valve 27, is opened when all the milk in the conduit 17, will flow off over the cooling table and into the can 43.

For cleaning the apparatus the stirring mechanism can be removed by taking off the head 21, when the cylinder 32, can be pulled out. The arms 34, and friction rollers 35, will support the inner end of the shaft 30, and when the stirring apparatus is replaced the rounded end 36, of the shaft 30, and the flaring mouth of the recess 20, will guide this end of the shaft into the recess and lift it to its bearing so that friction rollers 35, will no longer touch the walls of the pipe 17.

To remove the conduit 17, the bolts 46, should be taken out and also the bolts 47, when the whole conduit can be drawn out of the boiler leaving its head 18, in place. To remove this head the union couplings 26, must be unscrewed so that the pipes 24, and 25, can go with the head. The advantages of my invention are evident. The milk goes from the reservoir 44, to the receiving can 43, automatically and continuously without having to be handled by laborers and without being exposed to the atmosphere. It is gradually raised to the temperature desired and its flow can be absolutely and exactly controlled. It is sufficiently cooled in passing in a constantly regulated current over the cooling table 29, so that it can be drawn off and bottled immediately after its reception in the receiving tank 43.

The action of the apparatus is equable, the milk not being scorched at one point and not heated at the other as is frequently the case in other apparatus and the body of water in the boiler 2, insures uniformity of temperature at any one point of the boiler throughout adjacent periods of time independent of the necessary variations of heat in the furnace. The heat generated by the fuel is all efficiently employed in raising the milk to the desired temperature and none is wasted.

The pipe 57, provided with valve 48, is a connection by which water may be introduced into the milk conduit, 17, for the purpose of washing it out. It is also advisable, after the milk conduit has been emptied and the machine is to be cooled down, to fill the conduit with hot water through pipe 57, so that all parts will cool down at the same rate of speed.

Having therefore described my invention, what I claim as new, and desire to protect by Letters Patent, is—

1. In a milk sterilizing apparatus, the combination with the hot water boiler and its heads, a milk conduit arranged in said boiler and extending through said heads, an inflow connection at one end of said milk conduit, an upper and a lower outflow connection arranged at the other end of the same, and a valve arranged in each of said upper and lower outflow connections, all said parts substantially as and for the purposes described.

2. In a milk sterilizing apparatus, a cooling table consisting of a slightly inclined top, a reservoir arranged at one end thereof, and a series of diagonal frets arranged in opposite directions on said top, all said parts substantially as and for the purposes described.

3. In a milk sterilizing apparatus the combination of the hot water boiler, the milk conduit which passes through the same, the head for said conduit provided with the central recess with flaring mouth, the rotatable shaft in said conduit provided with stirring blades and having its end rounded off so as to enter the recess in the head, and one or more arms each provided with a roller which support the end of the shaft when it is withdrawn from its bearing in the recess, substantially as described.

4. In a milk sterilizing apparatus, the combination with the furnace, of a hot water boiler arranged in said furnace, a head on each end of said boiler, a milk conduit extending through said boiler and through the heads thereof, an inflow connection on one end of the boiler, an upper and a lower valve controlled outflow connection at the other end thereof and means for cooling the outflowing milk, said means being connected with the upper and lower outflow, all said parts, substantially as and for the purposes described.

5. In a milk sterilizing apparatus, the combination with the hot water boiler, a milk conduit arranged in said boiler, a removable head on one end of said conduit, a fixed head arranged on the other end thereof and provided with a recess, having a flaring mouth, a shaft on said conduit and extending through said removable head and having its opposite end rounded off and adapted to enter said recess in the fixed head, and a series of stirring blades arranged on said shaft, all said parts, substantially as and for the purposes described.

In testimony whereof I affix my signature in presence of two witnesses.

EDWARD LESLIE.

Witnesses:
WARREN W. FOSTER.
A. P. SMITH.